(12) United States Patent
Williams et al.

(10) Patent No.: US 10,928,845 B2
(45) Date of Patent: *Feb. 23, 2021

(54) SCHEDULING A COMPUTATIONAL TASK FOR PERFORMANCE BY A SERVER COMPUTING DEVICE IN A DATA CENTER

(71) Applicant: Microsoft Technology Licensing, LLC, Redmond, WA (US)

(72) Inventors: Charles Joseph Williams, Bothell, WA (US); Gabriel Kliot, Redmond, WA (US); Chia-Chi Lin, Urbana, IL (US); Shaun L. Harris, Sammamish, WA (US); Christian L. Belady, Mercer Island, WA (US); Eric C. Peterson, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 86 days.

This patent is subject to a terminal disclaimer.

(21) Appl. No.: 16/176,836

(22) Filed: Oct. 31, 2018

(65) Prior Publication Data

US 2019/0072992 A1 Mar. 7, 2019

Related U.S. Application Data

(63) Continuation of application No. 14/727,746, filed on Jun. 1, 2015, now Pat. No. 10,126,771, which is a (Continued)

(51) Int. Cl.
*G05F 1/66* (2006.01)
*G06K 9/00* (2006.01)
(Continued)

(52) U.S. Cl.
CPC ............... *G05F 1/66* (2013.01); *G01W 1/00* (2013.01); *G06K 9/0063* (2013.01); *G06N 5/048* (2013.01)

(58) Field of Classification Search
CPC ........ G05F 1/66; G06N 5/048; G06K 9/0063; G01W 1/00
See application file for complete search history.

(56) References Cited

U.S. PATENT DOCUMENTS 5,568,385 A 10/1996 Shelton
5,587,714 A 12/1996 Chu et al.
(Continued)

OTHER PUBLICATIONS

Kurihata, et al., "Rainy Weather Recognition from In-Vehicle Camera Images for Driver Assistance", Retrieved at <<http://www.murase.m.is.nagoya-u.ac.jp/seikaweb/paper/2005/E05-conference-hkuri-1.pdf >>, IEEE 2005 Intelligent Vehicle Symposium, Jul. 2005, 6 pages.

*Primary Examiner* — Mohammad Ali
*Assistant Examiner* — Sheela Rao
(74) *Attorney, Agent, or Firm* — Medley, Behrens & Lewis, LLC

(57) ABSTRACT

Described herein are various technologies pertaining to predicting an amount of electrical power that is to be generated by a power system at a future point in time, wherein the power system utilizes a renewable energy resource to generate electrical power. A camera is positioned to capture an image of sky over a geographic region of interest. The image is analyzed to predict an amount of solar radiation that is to be received by the power source at a future point in time. The predicted solar radiation is used to predict an amount of electrical power that will be output by the power system at the future point in time. A computational resource of a data center that is powered by way of the
(Continued)

power source is managed as a function of the predicted amount of power.

20 Claims, 6 Drawing Sheets

Related U.S. Application Data continuation of application No. 12/970,972, filed on Dec. 17, 2010, now Pat. No. 9,069,103.

(51) Int. Cl.
*G01W 1/00* (2006.01)
*G06N 5/04* (2006.01)

(56) References Cited

U.S. PATENT DOCUMENTS

| | | | |
|---|---|---|---|
| 6,587,687 B1 | 7/2003 | Wiedeman | |
| 7,250,945 B1 | 7/2007 | Scaman et al. | |
| 7,536,260 B2 | 5/2009 | Hillman | |
| 7,580,817 B2 * | 8/2009 | Bing | G01W 1/10 703/6 |
| 8,086,544 B2 * | 12/2011 | Boss | G06Q 10/04 705/400 |
| 8,375,229 B2 | 2/2013 | Saeki | |
| 10,126,771 B2 * | 11/2018 | Williams | G01W 1/00 |
| 2002/0181739 A1 | 12/2002 | Hallowell et al. | |
| 2004/0068564 A1 | 4/2004 | Snoddy et al. | |
| 2004/0162799 A1 | 8/2004 | Schisler et al. | |
| 2008/0183389 A1 | 7/2008 | Chainer et al. | |
| 2010/0025483 A1 | 2/2010 | Hoeynck et al. | |
| 2010/0161147 A1 | 6/2010 | Adam | |
| 2010/0198420 A1 | 8/2010 | Rettger et al. | |
| 2010/0242354 A1 * | 9/2010 | Perkins | C10G 2/30 44/639 |
| 2010/0257531 A1 * | 10/2010 | Barsness | G06F 9/4893 718/102 |
| 2010/0328499 A1 | 12/2010 | Sun | |
| 2012/0010757 A1 | 1/2012 | Francino et al. | |
| 2012/0065788 A1 | 3/2012 | Harper, III et al. | |
| 2012/0155704 A1 | 6/2012 | Williams et al. | |

* cited by examiner

SCHEDULING A COMPUTATIONAL TASK FOR PERFORMANCE BY A SERVER COMPUTING DEVICE IN A DATA CENTER

RELATED APPLICATIONS

This application is a continuation of U.S. Pat. No. 10,126,771, issued on Nov. 13, 2018, and entitled "LOCALIZED WEATHER PREDICTION THROUGH UTILIZATION OF CAMERAS", which is a continuation of U.S. Pat. No. 9,069,103, issued on Jun. 15, 2015, and entitled "LOCALIZED WEATHER PREDICTION THROUGH UTILIZATION OF CAMERAS." The entireties of these patents are incorporated herein by reference.

BACKGROUND

Renewable energy resources are energy resources that are replaced by natural processes at rates faster than such energy resources can be consumed by humans. Examples of renewable energy resources include solar radiation, wind, tides, amongst others. Non-renewable energy resources are energy resources that cannot be produced naturally at the rate they are consumed by humans. Examples of non-renewable energy resources include fossil fuels, such as coal, petroleum, and natural gas, as well as materials utilized to generate nuclear power, such as Uranium. These non-renewable energy resources may have environmental issues associated therewith; for instance, experts have posited that carbon generation may cause global warming. In addition, fossil fuels will become more difficult to extract as supply thereof is diminished, thereby causing costs associated therewith to increase.

As the population of the world has increased, demand for energy has likewise increased, due to population growth as well as more sophisticated apparatuses that require energy to effectively operate (computers, mobile phones, etc.). In an example, data centers that are configured to perform complex computational tasks require a significant amount of energy to operate effectively. For instance, relatively large data centers can have an electrical power draw of multiple megawatts at any particular point in time. Furthermore, recent studies indicate that costs of powering data centers are expected to exceed costs of equipment in the relatively near future.

The majority of energy consumed by humans is generated through utilization of non-renewable energy resources. Due to increasing costs and environmental concerns mentioned above, as well as prospects of significant taxation on atmospheric carbon generation, there is increasing global pressure to look to renewable energy sources for generating electrical power. Several issues still exist, however, with respect to power systems that utilize renewable energy resources to generate power. These issues include site selection as well as energy management.

For instance, once a power system that utilizes renewable energy resources to generate electrical power is constructed, the power system will output variable amounts of power over time, as the renewable energy resources vary over time and location. In an example, a wind turbine does not receive a constant amount of wind, but instead receives varying amounts of wind over time. Thus, power output by the wind turbine is varying. Accordingly, if demand for power does not correspond to supply, then consumers of power may not be provided with adequate power from the power system.

SUMMARY

The following is a brief summary of subject matter that is described in greater detail herein. This summary is not intended to be limiting as to the scope of the claims.

Described herein are various technologies pertaining to predicting at least one weather condition and utilizing a predicted weather condition to manage computational resources at a data center. For instance, at least one weather condition can be predicted with respect to a relatively small geographic region that has a power source thereon, wherein the power source utilizes a renewable energy resource corresponding to the at least one weather condition to generate electrical power. In one exemplary embodiment, a camera can be employed to capture an image of the sky over a certain geographic region, wherein the geographic region includes a power source that utilizes renewable energy to generate electrical power. In an example, the power source can include at least one solar panel, such that the power source outputs electrical power based at least in part upon solar radiation received at the solar panel. Furthermore, in an exemplary embodiment, the camera can be positioned proximate to ground level and pointed upwards towards the sky. In an alternative embodiment, the camera can be coupled to an orbiting satellite and can capture images of the sky from above. Moreover, multiple cameras located in different geographic regions can be in communication, such that information obtained by way of images generated by a first camera can supplement information that is obtained by way of images generated by a second camera.

An image captured by way of the camera can be analyzed to predict at least one weather condition for the geographic region at a time in the future. For example the weather condition used may be the amount of solar radiation that is predicted to be received by the aforementioned solar panel. Accordingly, the geographic region may be relatively small (e.g., less than a square mile), and the time in the future may be relatively close to a current time (e.g., less than an hour). It can be ascertained that predicting the weather condition in such a manner is markedly different from conventional weather prediction techniques, as the prediction is with respect to a highly localized area and can be undertaken with respect to a particular weather condition (e.g., wind speed and/or solar radiation). Additionally, as the prediction of the weather condition is undertaken with respect to a relatively small geographic region, the prediction of the weather condition can be highly accurate for such geographic region. In an example, at least one weather condition can be predicted based in part upon current sun and cloud conditions as well as estimated/known positions of the sun and cloud parameters (size, location, etc.) in the future.

Subsequent to the at least one weather condition being predicted based at least in part upon the image captured by the camera, an amount of electrical power output by a power system that utilizes a renewable energy resource to generate electrical power can be predicted at the future point in time. For instance, power output by a power source can be dependent upon an amount of solar radiation received by the solar panel. As the amount of solar radiation can be predicted, by for instance cloud coverage, the amount of electrical power to be output by the power source at the future point in time can be predicted.

The predicted amount of output power by the power source can then be employed in connection with managing at least one computational resource in a data center. For instance, if the solar panel is predicted to receive a significant amount of solar radiation at the future point in time, then workloads corresponding to one or more computing apparatuses in the data center can be increased to take advantage of the power output by the power source. Similarly, if the amount of electrical power to be output by the power source is predicted to be unchanged from a current time to the point in time in the future, then requests for additional processing tasks at the data center can be denied.

Other aspects will be appreciated upon reading and understanding the attached figures and description.

DETAILED DESCRIPTION

Figure 1:
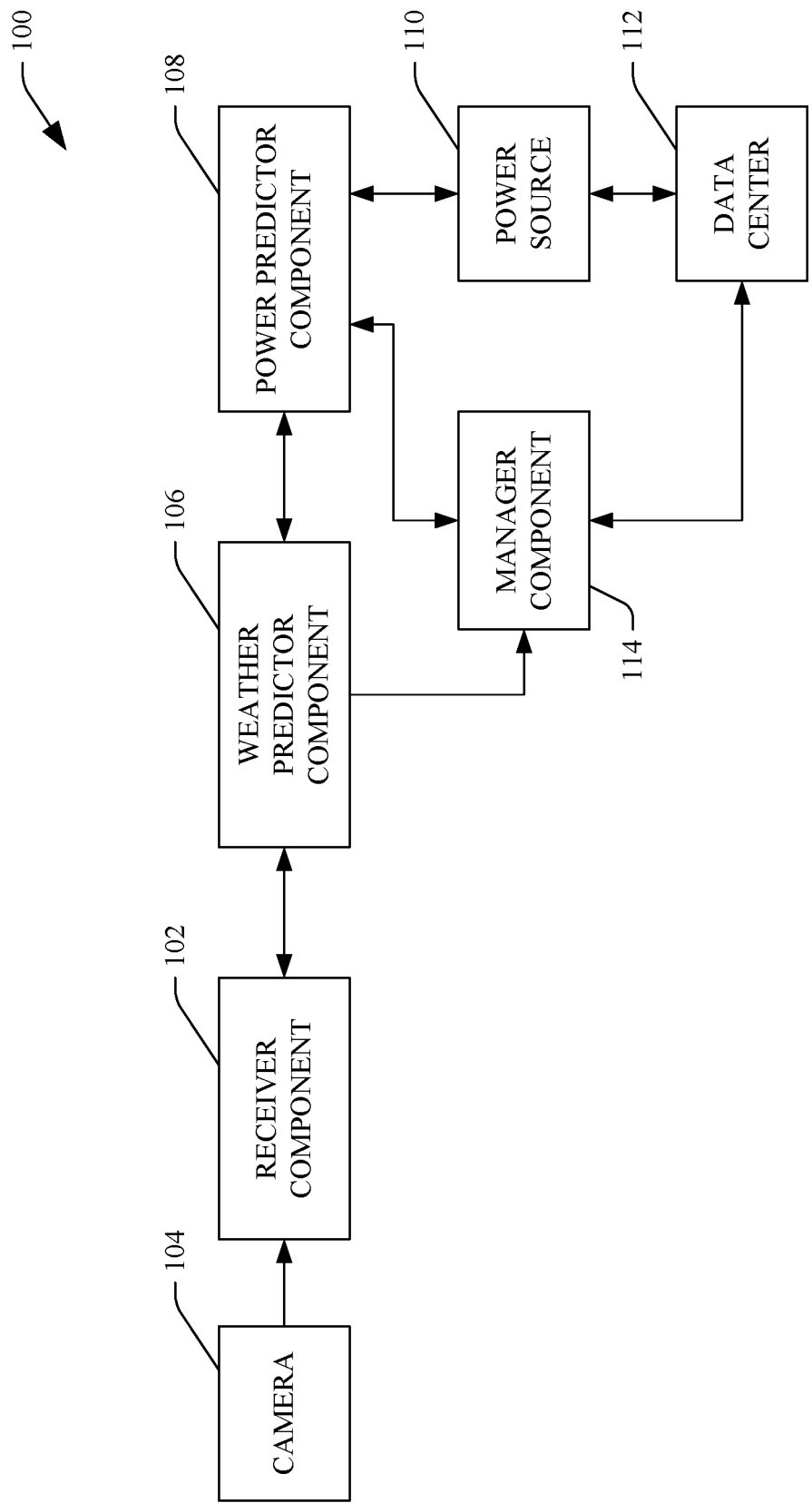
FIG. 1 is a functional block diagram of an exemplary system that facilitates predicting an amount of power to be output by a power source based at least in part upon a predicted weather condition.

Various technologies pertaining to managing computational resources at a data center will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

With reference to FIG. 1, an exemplary system 100 that facilitates managing computational resources of a data center based at least in part upon a predicted weather condition is illustrated. The system 100 includes a receiver component 102 that receives an image of the sky over a geographic region of interest from a camera 104. Pursuant to an example, the camera 104 can be positioned proximate to earth and pointed upwards towards the sky, such that the image of the sky is captured from earth. Alternatively, the camera 104 can be coupled to a satellite orbiting the earth and pointed downwards, such that the image of the sky is captured from above the atmosphere of the earth. In still yet another example, the camera 104 may be coupled to an airplane that is flying above one or more clouds.

A weather predictor component 106 is in communication with the receiver component 102 and generates a prediction for at least one weather condition at a future point in time based at least in part upon the image received from the receiver component 102. The weather predictor component 106 can utilize various technologies/techniques in connection with predicting the at least one weather condition, including but not limited to machine learning, linear predictions, neural networks, support vector machines, Bayesian networks, amongst others. The at least one weather condition can be, for instance, the amount of solar radiation expected to be received at or within the particular geographic region, speed and/or direction of wind passing through the geographic region, or other suitable weather condition. Additional detail pertaining to predicting the at least one weather condition through analysis of one or more images generated by the camera 104 is provided below.

A power predictor component 108 can receive the at least one predicted weather condition from the weather predictor component 106, and can predict an amount of power to be generated by a power source 110 at the future point in time. Specifically, the power source 110 can utilize a renewable energy resource to generate electrical power. This renewable energy resource may be solar radiation, wind, tides, or the like. Thus, the power source 110 may be or include a solar panel that operates to transform captured solar radiation into electrical power. In another example, the power source 110 can comprise a wind turbine, wherein electrical power is generated based at least in part upon velocity of rotation of blades of the wind turbine. In yet another example, the power source 110 can include a water turbine, wherein electrical power is generated based at least in part upon rotation of a turbine in water. Since the electrical power output by the power source 110 is a function of the at least one weather condition, the power predictor component 108 can predict future amounts of electrical power to be output by the power source 110 based at least in part upon predictions of the at least one weather condition in the future. Other factors that can be employed in connection with predicting future electrical power to be output by the power source 110 include historical electrical power output by the power source (correlated with historical weather conditions), current power output by the power source 110, amongst other factors.

In an exemplary embodiment, the power source 110 can provide electrical power to a data center 112. For instance, the data center 112 may be disconnected from a conventional power grid, such that the data center 112 is provided with electrical power solely from the power source 110 (and possibly a backup power source, such as a generator, a battery backup, or the like). In another example, the power source 110 may be the primary power source or a supplemental power source for the data center 112, and the data center 112 can receive electrical power from a conventional power grid based at least in part upon an amount of electrical power being output by the power source 110.

The data center 112 can include a plurality of computing devices, such as servers, switches, routers, etc. The data center 112, in an example, can be owned and/or operated by a particular entity, and can perform computational tasks required by the entity or requested by customers of the entity. For instance, computational tasks can include numerical analysis, data storage and maintenance, and the like. In another example, the data center 112 may be a single computing device that is configured to perform certain computing tasks.

The system 100 can further comprise a manager component 114 that can manage computational resources in the data center 112 based at least in part upon the amount of power predicted to be output at the future point in time by the power predictor component 108. "Managing computational resources", as used herein, is intended to refer to managing processing cycles currently allocated to computational tasks and/or available processing cycles that have not been allocated to a computational task as well as preparing a backup power source to provide power to the data center 112.

Thus, when managing processing resources, the manager component 114 can perform one or more of the following acts: schedule offloading of computational tasks to another data center based at least in part upon a predicted reduction in electrical power to be output by the power source 110; schedule reduction of processing cycles made available for a particular computational task based at least in part upon a predicted reduction in electrical power to be output by the power source; maintain current workloads on computing devices in the data center 112 based at least in part upon a prediction that power output by the power source 110 will remain relatively stable; schedule increase in processing cycles made available for a particular computational task based at least in part upon a predicted increase in electrical power to be output by the power source 110; schedule a new computational task based at least in part upon a predicted increase in electrical power to be output by the power source 110, amongst other scheduling tasks. Additionally, the manager component 114 can schedule computational tasks based at least in part upon an expected time that a threshold amount of power is available from the power source 110, such that tasks that can be completed within an estimated window of time (where power is available) can be scheduled at the data center 112 while other tasks are offloaded or delayed.

Other tasks that can be performed by the manager component 114 comprise turning off or throttling servers in the data center 112, turning on servers in the data center 112, scheduling batch jobs, such that when, for instance, a significant amount of solar radiation is predicted to be received at the power source 110, the manager component 114 can schedule batch computing jobs. Still further, the manager component 114, based upon predicted power output by the power predictor component 108, can determine how long a battery backup with a current charge needs to last during an expected downtime, and can schedule charging of the battery backup when the power is predicted to be relatively high.

Moreover, the manager component 114 can manage at least one computational resource based at least in part upon priorities assigned to customers of the data center 112. As mentioned previously, the data center 112 may perform computing tasks for one or more customers. As the data center 112 can be provided with varying amounts of electrical power, service level agreements (SLAs) pertaining to the customers may specify priorities assigned to computing tasks of the respective customers. For instance, a first customer may wish to have certain guaranteed service levels with respect to computing tasks undertaken at the data center 112, while a second customer may pay less (and thus have a lower priority) and not have such guaranteed service levels. If the power predictor component 108 predicts that the amount of power output by the power source 110 is going to drop at a certain time in the future, then the manager component 114 can manage computational resources of the data center 112 based at least in part upon priorities assigned to computing tasks (and/or customers).

Still further, the manager component 114 can act as a global scheduler that manages computational resources of multiple data centers based at least in part upon predicted weather conditions (and thus predicted power resources available) corresponding to such data centers. In another embodiment, the manager component 114 can receive information from a global scheduler, which can act to optimize work loads across the multiple data centers.

Additional detail pertaining to operation of the weather predictor component 106 will now be provided. In an exemplary embodiment, the weather predictor component 106 can predict an amount of solar radiation that will be received by a solar panel at future points in time based at least in part upon images received from the camera 104. Thus, the geographic region for which the at least one weather condition is predicted at the point in time in the future by the weather predictor component 106 can be relatively small. In a first example, the geographic region can be less than ten square miles. In another example, the geographic region can be less than five square miles. In still yet another example, the geographic region can be less than one square mile.

As indicated above, the camera 104 can be positioned proximate to earth and can be pointed upwards towards the sky. In an example, the camera 104 can include a fisheye lens, such that a relatively large portion of the horizon can be captured by the camera 104. The position and orientation of the camera 104 can be known—accordingly, position of the sun can be known or estimated accurately (if the sun is behind clouds) based at least in part upon time of day and/or location of the sun in previously received images. As the position of camera 104 is constant and the position of the sun in an image can be known or estimated accurately, position of the sun at points in time in the future can be estimated accurately.

The camera 104 can be configured to periodically or continuously capture images of the sky above the geographic region of interest at a suitable frequency. Based at least in part upon estimating position of the sun at points in time in the future, the weather predictor component 106 can output accurate predictions with respect to at least one weather condition for the geographic region of interest. Specifically, by analyzing images of the sky over time, the weather predictor component can determine a plurality of attributes pertaining to the at least one weather condition, including size of a cloud in the sky, shape of the cloud in the sky, direction of travel of the cloud in the sky, change in shape of the cloud (whether the cloud is getting bigger or smaller), velocity of cloud movement in the sky, acceleration of cloud movement in the sky, changes in overall cloud cover in the sky, boundaries of the cloud in the sky, lumens corresponding to the cloud in the sky, opaqueness of the cloud in the sky, whether there is any current rainfall, amongst other data. Based at least in part upon one or more of these determined attributes, the weather predictor component 106 can, for instance, predict an intensity of solar radiation that is expected to be received at points in time in the future at the geographic region of interest (e.g., at the solar panel). In another example, one or more of these factors can be indicative of future ground-level wind speeds, and the weather predictor component 106 can predict future wind speeds proximate to the power source 110, wherein the power source 110 comprises a wind turbine. Specifically, velocity of movement of at least one cloud in the sky can be utilized to predict ground wind speeds currently and/or at future instances in time.

With still more specificity, a first image captured by the camera 104 can include at least one cloud. The weather predictor component 106 can perform image analysis to ascertain various features pertaining to the cloud, such as different thicknesses of the cloud (clouds are not uniformly thick), ascertain boundaries of the cloud based upon some intensity threshold in the image, amongst other information pertaining to the cloud. Subsequently in time, the weather predictor component 106 can receive a second image captured by the camera 104. The weather predictor component 106 can perform the image analysis described above on the second image, and can further perform image analysis to ascertain alterations between images.

Thus, by comparing the first image and the second image, the weather predictor component 106 can determine alteration of position of the cloud between two images, and can therefore determine direction of travel of the cloud as well as velocity and/or acceleration of the cloud in the determined direction. Moreover, alterations in shape of the cloud, thickness of portions of the cloud, etc. can be ascertained by determining intensity differences between pixels corresponding to the cloud in the images. Based upon such information, the weather predictor component 106 can model/predict location, shape, thickness, etc. of the cloud at future points in time. Moreover, as mentioned above, the weather predictor component 106 can know or accurately estimate the position of the sun at future points in time. Accordingly, through simulation or other suitable approach, the weather predictor component 106 can compare future positions of the sun with future positions of clouds, taking into consideration uncertainty over time, and can therefore predict future intensities of solar radiation that are expected to reach a solar panel. Further, the weather predictor component 106 can additionally output data that is indicative of a probability of the predicted weather condition being correct, wherein such probability will be higher at earlier points in time than later points in time.

Moreover, images generated by one camera at a first site can influence prediction of at least one weather condition at another site. For instance, if it is determined at a first site (through analysis of images captured by a first camera) that wind is blowing in a direction towards a second site that is relatively proximate to the first site, then it can be inferred that a substantially similar weather condition will occur at the second site in an estimated amount of time.

To simplify computation, portions of images analyzed by the weather predictor component 106 can be ignored. For instance, the sun may be moving in a first direction and a cloud may be moving in an opposite direction. After the cloud has passed the sun, the cloud is irrelevant to solar radiation received at the power source 110. Accordingly, portions of images that are irrelevant to the at least one weather condition predicted by the weather predictor component 106 can be ignored by the weather predictor component 106.

In still yet another exemplary embodiment, the weather predictor component 106 can execute one of the aforementioned simulations and output predicted point(s) in time in the future that solar radiation received at the power source 110 will drastically change. Thus, in addition to outputting the at least one predicted weather condition or alternatively to outputting the at least one predicted weather condition, the weather predictor component 106 can output an indication of time (e.g., a time in the future when the sun is expected to be behind a cloud). This temporal information can be provided to the power predictor component 108 and/or the manager component 114, and the manager component 114 can schedule computational tasks based at least in part upon the predicted point(s) in time corresponding to the aforementioned change(s) in solar radiation received at the power source 110. The estimated point(s) in time can be updated by the weather predictor component 106 upon receipt of at least one additional image from the camera 104.

It is also to be understood that the weather predictor component 106 can receive information from other sources in connection with generating predictions of the at least one weather condition over time. For instance, the weather predictor component 106 can receive data from a humidity sensor, a lumen sensor, a barometer, a general weather source such as a web page, or other suitable source of weather-related information, and can predict the at least one weather condition based at least in part upon images from the camera 104 and data from one or more of these sources. Furthermore, active learning techniques can be employed in connection with automatically improving accuracy of predictions output by the weather predictor component 106. That is, the weather predictor component 106 may assign weights to different features in the images received from the camera 104, and these weights can be automatically updated through utilization of active learning techniques.

In addition, the weather predictor component 106 can be employed in connection with learning/refining a position and orientation of the camera 104, thereby increasing accuracy of predictions of weather. Initially (e.g., during setup of the system 100), data indicating location and/or orientation of the camera 104 can be provided, wherein such data can be manually entered or automatically output from the camera 104 if the camera 104 includes location identifying functionality (e.g., a GPS receiver). The location can be identified by latitude/longitude coordinates. Other information can also be stored with such data, including time that the location of the camera 104 was established, a reference direction (e.g., north), as well as some error tolerance. Once the system 100 is operational, the weather predictor component 106 can receive time information from an accurate time source and calculate a relatively precise position of the sun in the sky. This position can be compared with a position of the sun as captured in an image by the camera 104, and a comparison can be undertaken to determine error with respect to the position of the sun as determined in the image. Over time, the weather predictor component 106 can utilize the error information to refine the position/orientation of the camera 104 to generate still more accurate predictions of the at least one weather condition.

Moreover, the system 100 has been described as utilizing images from a single camera. In another exemplary embodiment, multiple cameras can be employed in connection with capturing images of the sky above the geographic region of interest. For instance, two cameras can be placed in geographic proximity with one another (e.g., within one mile of one another, within two miles of one another, within three miles of one another, . . . ), and such cameras can be synchronized such that the cameras capture images of the sky at substantially similar points in time. Images captured by the cameras may then be automatically stitched together and provided to the weather predictor component 106 as a single image. Thus, a greater amount of sky above the power source 110 can be captured, allowing for predictions of the at least one weather condition at points in time further in the future than can be obtained through utilization of images from a single camera.

Additionally or alternatively, multiple cameras can be selectively positioned such that, through analysis of images generated by the multiple cameras, depth information pertaining to clouds captured in the image can be ascertained. It is known that stereoscopic images can be analyzed to ascertain relative depth of objects captured in such images. Further, it is known that clouds at different depths from the earth can move with different velocities or in entirely different directions. The weather predictor component 106 can consider this depth information when predicting travel paths of clouds across the sky. Alternatively, other depth sensors can be employed to ascertain depth information pertaining to clouds captured in images. Thus, in other words, clouds occurring at different elevations can be associated with different wind directions. Two cameras separated by some distance can be employed to generate a stereo image. The stereo image can be analyzed to determine which portion of the image is associated with clouds/wind going in which direction, as well as if there are elements above one or more clouds that are moving in separate directions.

Furthermore, in an exemplary embodiment, multiple data center locations can be geographically dispersed, wherein each of the data center locations comprises a data center and a power source that provides electrical power to the corresponding data center, wherein each of the power sources utilizes renewable energy to generate electrical power. Each of these data center locations also comprises a receiver component, a weather predictor component, a power predictor component, and a manager component, such as those shown and described with respect to FIG. 1. Accordingly, processing operations at the data centers in the data center locations can be individually managed based at least in part upon predicted weather conditions that are local to such data centers. It can be ascertained, however, that two or more of these data center locations can be relatively geographically proximate to one another (e.g., within five miles of one another, within ten miles of one another, within fifty miles of one another, . . . ). Accordingly, in such a situation, the data center locations can be in communication with one another and can exchange data pertaining to predicted weather conditions. For instance, a first data center location can provide an indication to a second data center location that a cloud is currently at geographic position X and is travelling toward the second geographic location at a certain velocity. Such information can be employed at the second data center location to manage computing operations at such second data center location.

With respect to images generated by the camera 104, such images can be any suitable type of image, including an RGB image or an infrared image. Moreover, the camera 104 can be configured to capture still images or may be configured to output video that can be analyzed by the weather predictor component 106. Other types of images are also contemplated and are intended to fall under the scope of the hereto-appended claims.

It is to be understood that the receiver component 102, the weather predictor component 106, the power predictor component 108, and the manager component 114 can reside within the data center 112 itself, and the camera 104 and the power source 110 can be placed in geographic proximity with the data center 112. In another embodiment, one or more of the receiver component 102, the weather predictor component 106, the power predictor component 108, or the manager component 114 can reside on a server that is accessible to the data center 112 by way of a network connection. In such an embodiment, the aforementioned components can be employed in connection with managing computational resources of several data centers.

Figure 2:
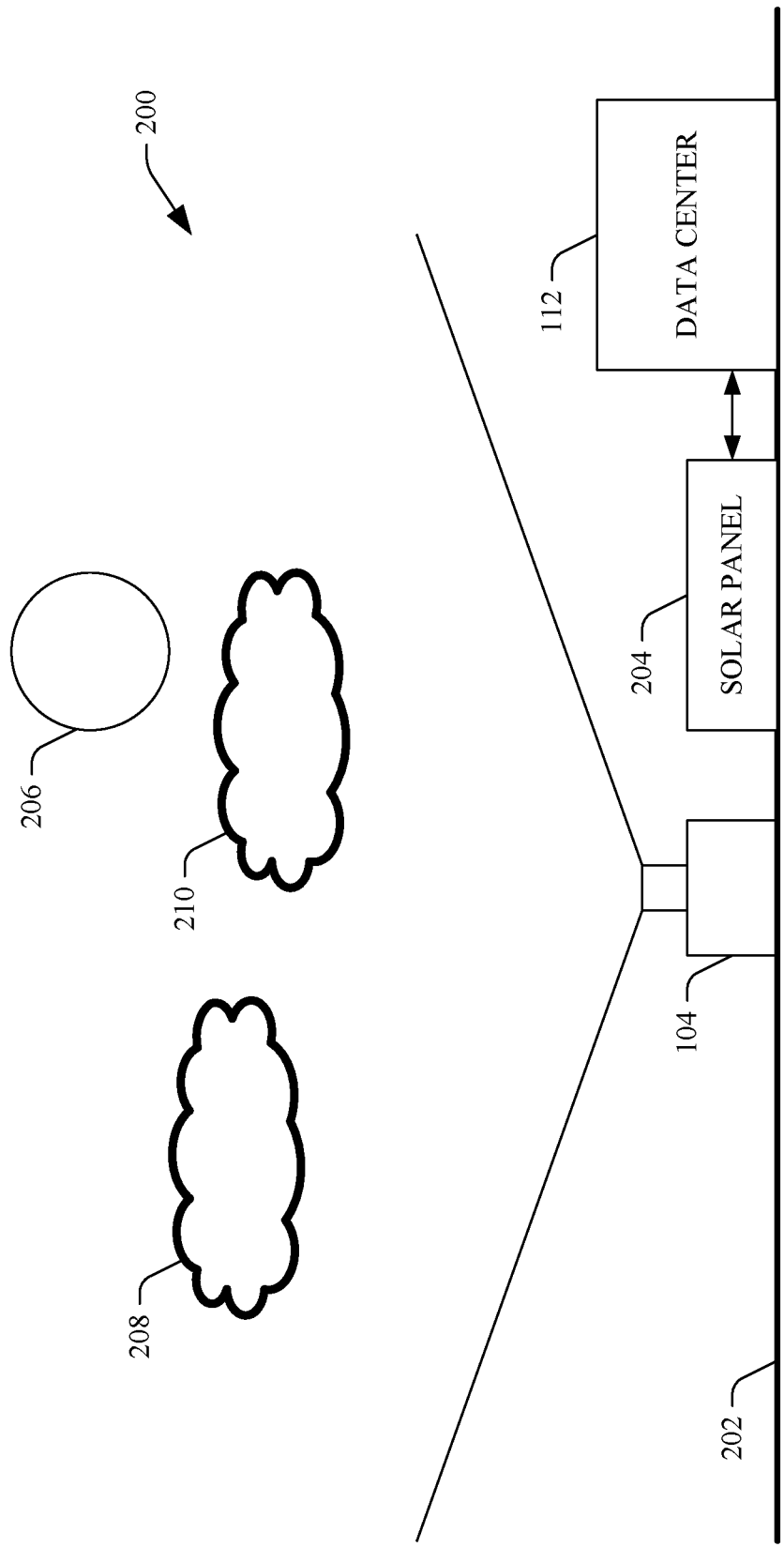
FIG. 2 illustrates an exemplary arrangement of a camera with respect to a power source and a data center.

Turning now to FIG. 2, an exemplary depiction of a data center location 200 is illustrated. The data center location 200 comprises the camera 104 that is positioned proximate to earth 202 such that a lens of the camera 104 is pointed towards sky. A solar panel 204 is in geographic proximity to the camera 104. For instance, the camera 104 and the solar panel 204 may be within one hundred feet of one another. In another example, the camera 104 and the solar panel may be within one thousand feet of one another. It is to be understood that it is desirable that the camera 104 and the solar panel 204 be collocated, such that prediction of solar radiation to be received by the solar panel 204 based at least in part upon images captured by the camera 104 be as accurate as possible. Distance between the camera 104 and the solar panel 204 can be considered when the at least one weather prediction is made.

The data center location 200 further comprises the data center 112, wherein the solar panel 204 provides electrical power to the data center 112 based at least in part upon an amount of solar radiation received at the solar panel 204 from the sun 206. As can be ascertained, an amount of solar radiation received at the solar panel 204 from the sun 206 can depend on existence of one or more clouds between the sun 206 and the solar panel 204. In the example depicted in FIG. 2, two clouds 208 and 210 are in the field of view of the camera 104, and thus may be included in an image captured by the camera 104. As described above, since the camera 104 is not moving relative to the earth 202, the position of the sun 206 in any image captured by the camera 104 can be known or accurately estimated. Based on this premise, as well as the fact that the camera 104 is geographically proximate to the solar panel 204, images output by the camera 104 can be analyzed over time as described above, and an amount of solar radiation received at the solar panel 204 from the sun 206 can be estimated at future instances in time.

It is to be understood that components of the system 100 (FIG. 1) can be calibrated based upon current images captured by the camera 104. For instance, when a cloud is in front of the sun 206 (e.g., between the sun 206 and the solar panel 204), electrical power output through utilization of the solar panel 204 will be less than when no clouds are between the sun 206 and the solar panel 204. The characteristics of the cloud determined through analysis of image(s) generated by the camera 104 as well as power output through utilization of the solar panel 204 can be utilized to generate future predictions with respect to power output through use of the solar panel 204. Accordingly, as mentioned above, power can be predicted through active learning.

Figure 3:
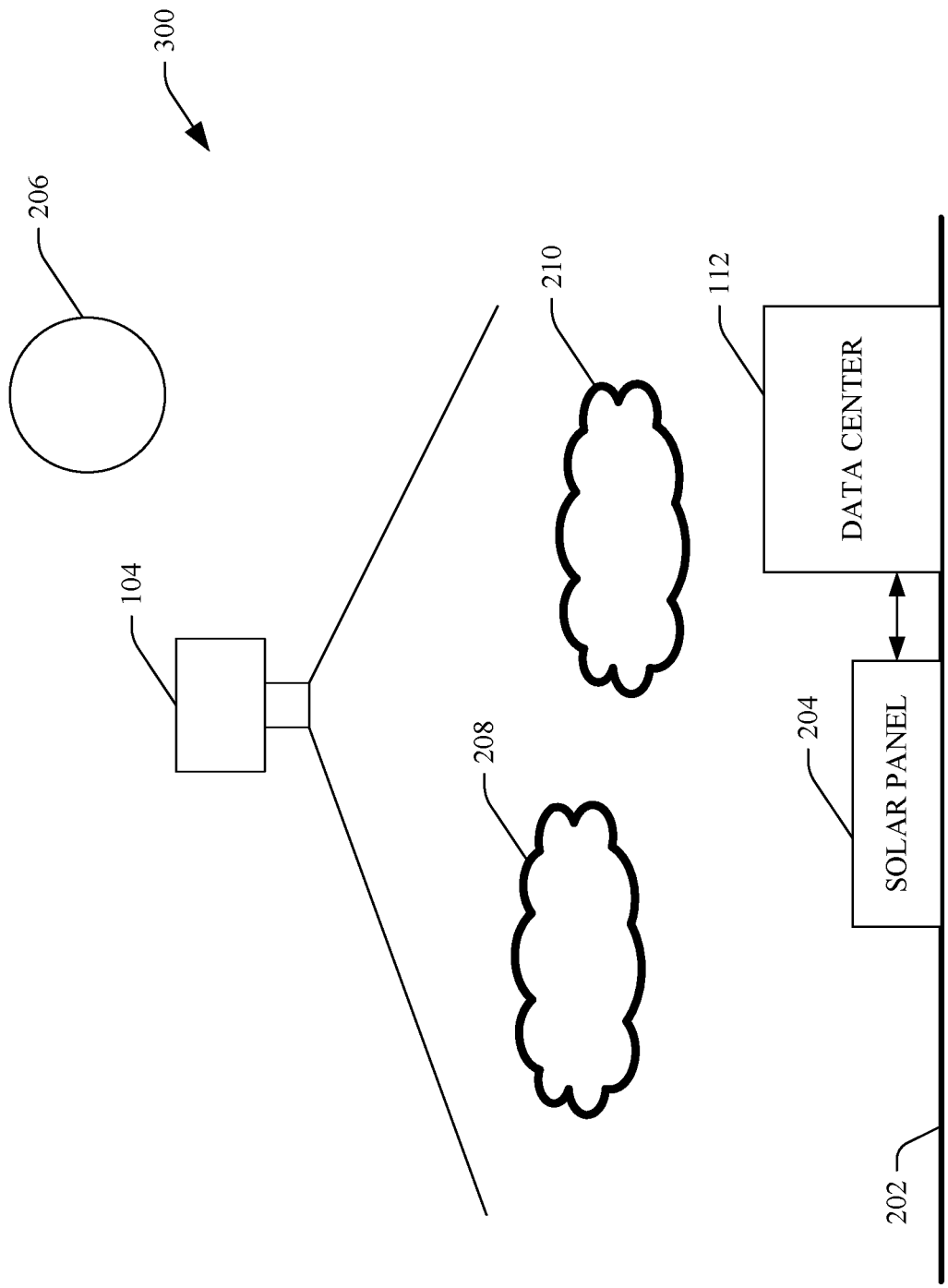
FIG. 3 illustrates an exemplary arrangement of a camera with respect to a power source and a data center.

Now referring to FIG. 3, an exemplary depiction of a data center location 300 is illustrated. In this exemplary depiction, the data center 112 is geographically proximate to the solar panel 204, which provides electrical power to the data center 112 based at least in part upon an amount of solar radiation received at the solar panel 204. The camera 104 is coupled to a satellite (not shown) that is above the atmosphere of the earth 202. Thus, the camera 104 is configured to capture images of the clouds 208 and 210 from above, rather than below.

Since, in some embodiments, the camera 104 may be moving relative to the earth 202 and the sun 206, analysis of images captured by way of the camera 104 can include locating certain reference points and ascertaining approximate geographic location of the solar panel 204 based at least in part upon such reference points. Utilizing known or estimated rotational velocity of the earth 202, a position of the sun 206 with respect to the solar panel 204 and/or the clouds 208 and 210 can be ascertained in an image output by the camera 104. Furthermore, through analysis of images over time, size, shape, location, etc. of the clouds 208 and 210 can be predicted at future points in time. Accordingly, as described above, an amount of solar radiation to be received by the solar panel 204 at some future point in time can be predicted. Furthermore, images captured by way of cameras on satellites can be utilized together with images captured by ground-based cameras to predict at least one weather condition corresponding to a geographic region of interest.

Figure 4:
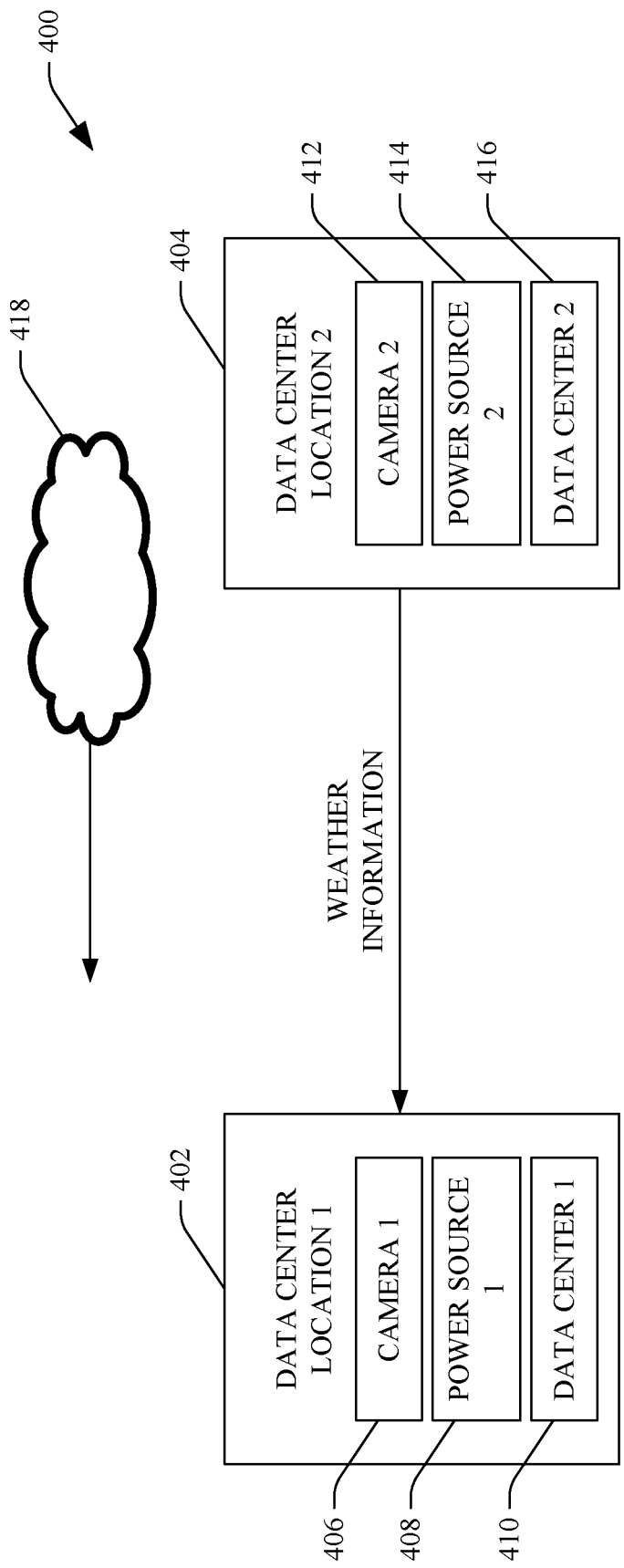
FIG. 4 is a functional block diagram of an exemplary system that facilitates communicating predicted weather conditions between data center locations.

Now referring to FIG. 4, an exemplary system 400 of data center locations is illustrated. The system 400 comprises a first data center location 402 and a second data location 404. The first data center location 402 comprises a first camera 406, a first power source 408, and a first data center 410. The first power source 408 utilizes renewable energy resources to provide electrical power to the first data center 410. The first camera 406 is configured to capture images of the sky above the first power source 408. As described above, these images can be utilized in connection with predicting power to be output by the first power source 408, which can be employed in connection with managing at least one computational resource of the first data center 410.

The second data center location 404 comprises a second camera 412, a second power source 414, and a second data center 416. The first data center location 402 can be somewhat geographically proximate to the second data center location 404. For instance, the first data center location 402 can be within one hundred miles of the second data center location 404. The second power source 414 generates electrical power by converting solar radiation to electrical power, and provides electrical power to the second data center 416. As described above, the second camera 412 captures images of the sky over the second power source 414, and at least one weather condition pertaining to the second data center location 404 is predicted based at least in part upon an analysis of such images. A predicted amount of power to be output by the second power source 414 can be determined based at least in part upon the at least one predicted weather condition.

In the example shown in FIG. 4, a cloud 418 is above the second power source 414, and is thus captured in images taken by the second camera 412. Through analysis of images captured by the second camera 412, a determination can be made that the cloud 418 is travelling at a particular velocity towards the second data center location 402. The second data center 416 may have some knowledge of relative location of the first data center 410 with respect to the second data center 416, and can cause weather information ascertained at the second data center location 404 to be transmitted to the first data center location 402. At least one computing resource may then be scheduled at the first data center 410 based at least in part upon the weather information provided by the second data center 416. The weather information can include size of the cloud 418, velocity of the cloud 418 towards the first data center location 402, acceleration of the cloud 418 towards the first data center location 402, current location of the cloud 418 relative to the second data center 416 and/or the first data center 410, amongst other weather information.

Still further, if the data center locations 402 and 404 are sufficiently geographically proximate, curvature of the earth can be taken into consideration, and overlapping portions of images captured by cameras 406 and 412 can be analyzed to ascertain depth of certain clouds in the sky. Thus, alterations in depth of clouds can be predicted over time as well as other cloud characteristics.

Figure 5:
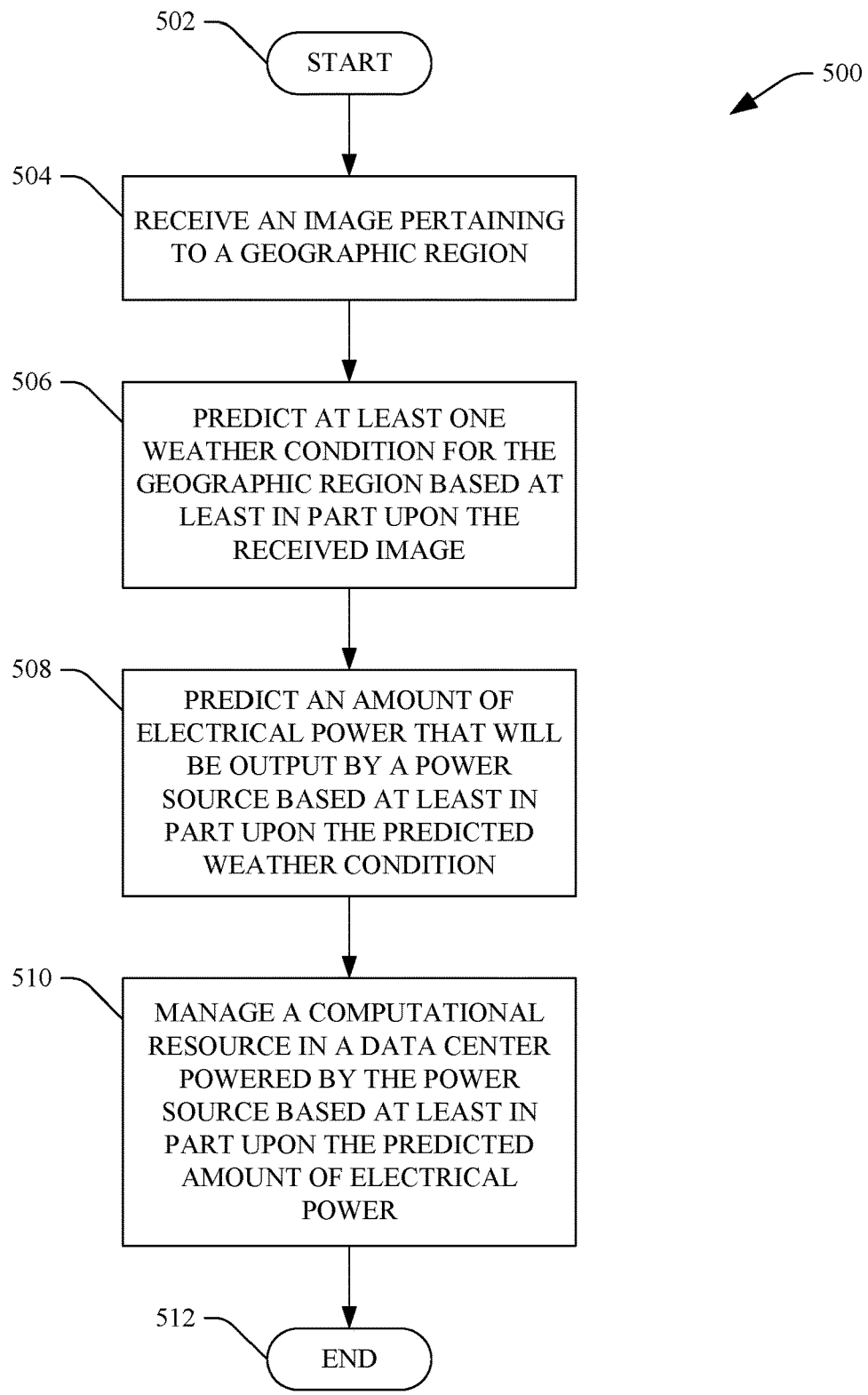
FIG. 5 is a flow diagram that illustrates an exemplary methodology for managing computational resources at a data center based at least in part upon a predicted weather condition pertaining to the data center.

With reference now to FIG. 5, an exemplary methodology is illustrated and described. While the methodology is described as being a series of acts that are performed in a sequence, it is to be understood that the methodology is not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodology may be stored in a computer-readable medium, displayed on a display device, and/or the like. The computer-readable medium may be a non-transitory medium, such as memory, hard drive, CD, DVD, flash drive, or the like.

Referring now to FIG. 5, a methodology 500 that facilitates managing at least one computational resource in a data center is illustrated. The methodology 500 begins at 502, and at 504 an image pertaining to a geographic region is received. The geographic region comprises a data center and power source that utilizes renewable energy resources to generate electrical power that is provided to the data center. Thus, the geographic region may be a relatively small geographic region, such as less than one square mile.

At 506, at least one weather condition for the geographic region is predicted for a future point in time based at least in part upon the image received at 504. As indicated above, the at least one weather condition can be a weather condition that is utilized by the power source to generate electrical power. Thus, if the power source comprises a solar panel, then solar radiation can be that at least one weather condition. In another example, if the power source comprises a wind turbine, then wind speed at the ground level can be the at least one weather condition.

At 508, an amount of electrical power that will be output by the power source is predicted for the future point in time based at least in part the at least one weather condition predicted at 506. Properties of the power source can be known, such as how much electrical power is generated with respect to a certain amount of solar radiation received, and accordingly electrical power to be output at the point in time in the future can be predicted based at least in part upon the properties of the power source.

At 510, at least one computational resource in the data center is managed based at least in part upon the predicted amount of electrical power to be output at the future point in time by the power source. The computational resource can be, for example, assignment of processing cycles to a particular computing task. The methodology 500 completes at 512.

While the examples provided above have referred to predicting an amount of electrical power to be output by a power source in connection with providing electrical power to a data center, it is to be understood that predicting amounts of power to be output by power sources that utilize non-renewable resources can be useful in other scenarios. For instance, municipalities that utilize such power sources as supplemental power sources to a conventional grid power system can schedule maintenance on one or more components of the conventional grid power system if a power source that utilizes renewable energy resources is predicted to output a significant amount of electrical power for a certain amount of time. In another example, solar panels can be utilized by households to supplement or replace receipt of power from conventional power grids. A homeowner may wish to monitor predicted power to be output through utilization of the solar panel to limit use of electrical power not provided by way of the solar panels. For instance, the homeowner may turn an air conditioner off subsequent to being informed that an amount of electrical power provided by way of the solar panel is expected to decrease. These implementations are feasible, as the hardware utilized to predict the at least one weather condition is relatively inexpensive.

Figure 6:
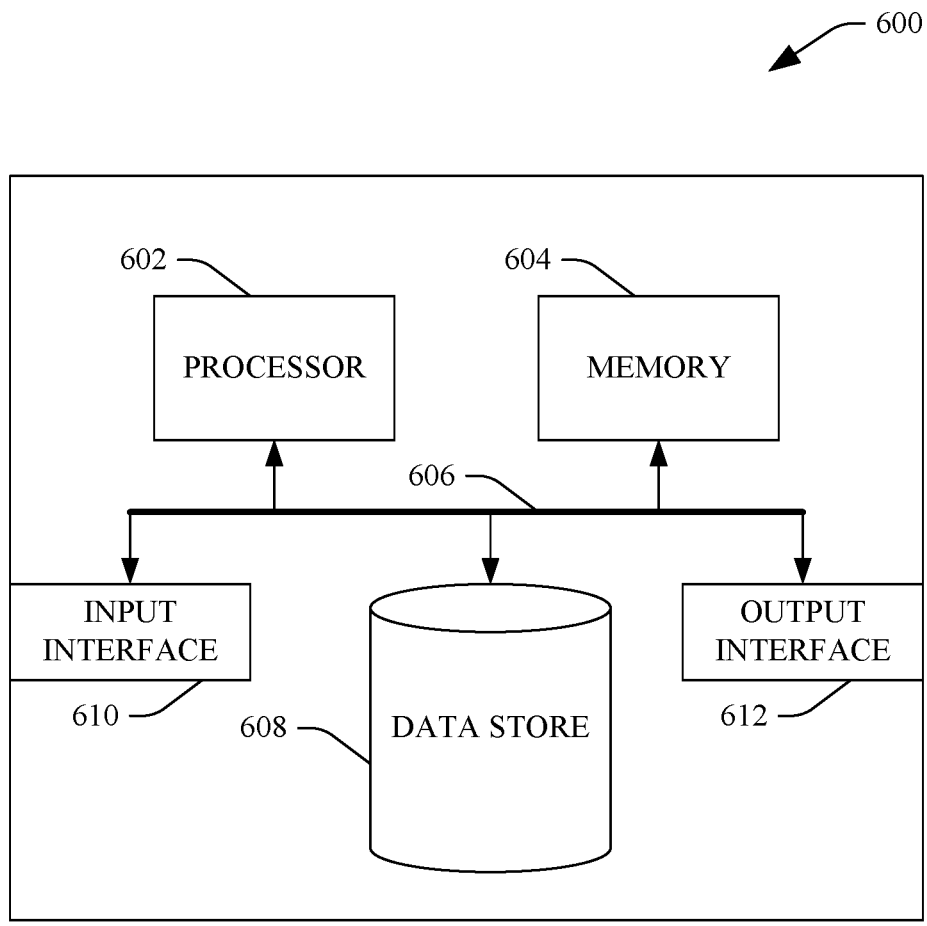
FIG. 6 is an exemplary computing system.

Now referring to FIG. 6, a high-level illustration of an exemplary computing device 600 that can be used in accordance with the systems and methodology disclosed herein is illustrated. For instance, the computing device 600 may be used in a system that supports utilizing images of a geographic region to predict at least one weather condition pertaining to the geographic region at a point in time in the future. In another example, at least a portion of the computing device 600 may be used in a system that supports predicting an amount of electrical power to be output by a power source that utilizes renewable energy resources to generate electrical power. The computing device 600 includes at least one processor 602 that executes instructions that are stored in a memory 604. The memory 604 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store images, locations of data centers, known travel path of sun, etc.

The computing device 600 additionally includes a data store 608 that is accessible by the processor 602 by way of the system bus 606. The data store may be or include any suitable computer-readable storage, including a hard disk, memory, etc. The data store 608 may include executable instructions, captured images, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

Additionally, while illustrated as a single system, it is to be understood that the computing device 600 may be a distributed system. Thus, for instance, several devices may be in communication by way of a network connection and may collectively perform tasks described as being performed by the computing device 600.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Furthermore, a component or system may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A system comprising:
   at least one processor; and
   memory that comprises instructions that, when executed by the at least one processor, cause the at least one processor to perform acts comprising:
   predicting that an amount of electrical energy provided to a data center by an energy source will be above a predefined threshold at a time in the future, wherein the energy source generates electrical energy based upon a renewable energy resource; and
   scheduling a server computing device at the data center to perform a computational task such that the computational task is performed by the server computing device at the time in the future, wherein the server computing device is scheduled to perform the computing task at the time in the future based upon the amount of electrical energy provided to the data center being predicted to be above the predefined threshold at the time in the future, and further the server computing device performs the computational task in accordance with the scheduling of the computation task.

2. The system of claim 1, wherein predicting that the amount of electrical energy provided to the data center by the energy source will be above the predefined threshold at the time in the future comprises:
   receiving an image pertaining to a geographic region, the data center located in the geographic region; and
   predicting a weather condition for the geographic region at the time in the future based upon the image pertaining to the geographic image, wherein the amount of electrical energy that is to be provided to the data center is predicted to be above the predefined threshold at the time in the future based upon the predicted weather condition.

3. The system of claim 2, wherein predicting the weather condition for the geographic region at the time in the future based upon the image pertaining to the geographic region comprises:
   computing a size of a cloud captured in the image, wherein the weather condition for the geographic region at the time in the future is predicted based upon the computed size of the cloud captured in the image.

4. The system of claim 2, wherein predicting the weather condition for the geographic region at the time in the future based upon the image pertaining to the geographic region comprises:
   computing a rate of change of a size of a cloud captured in the image, wherein the weather condition for the geographic region at the time in the future is predicted based upon the computed size of the cloud captured in the image.

5. The system of claim 2, wherein predicting the weather condition for the geographic region at the time in the future based upon the image pertaining to the geographic region comprises:
   based upon the image, computing a direction of movement of a cloud captured in the image, wherein the weather condition for the geographic region at the time in the future is predicted based upon the computed direction of movement of the cloud captured in the image.

6. The system of claim 2, wherein predicting the weather condition for the geographic region at the time in the future based upon the image pertaining to the geographic region comprises:

based upon the image, computing a velocity of a cloud captured in the image, wherein the weather condition for the geographic region at the time in the future is predicted based upon the computed velocity of the cloud captured in the image.

7. The system of claim 1, wherein the amount of electrical energy is predicted to be above the predefined threshold at the time in the future based upon historical weather conditions and corresponding output of electrical energy by the energy source.

8. The system of claim 1, wherein predicting that the amount of electrical energy provided to the data center by the energy source will be above the predefined threshold at the time in the future comprises:
predicting a weather condition for the time in the future at a geographic region, the geographic region includes the energy source, wherein the amount of electrical energy that is to be provided to the data center is predicted to be above the predefined threshold at the time in the future based upon the predicted weather condition.

9. The system of claim 1, the acts further comprising:
scheduling a battery backup for charging at the time in the future based upon the amount of electrical energy provided to the data center being predicted to be above the predefined threshold at the time in the future.

10. A method performed by a processor of a computing system, the method comprising:
predicting that an amount of electrical energy provided to a data center by an energy source will be above a predefined threshold at a time in the future, wherein the energy source generates electrical energy based upon a renewable energy resource; and
scheduling a server computing device at the data center to perform a computational task such that the computational task is performed by the server computing device at the time in the future, wherein the server computing device is scheduled to perform the computing task at the time in the future based upon the amount of electrical energy provided to the data center being predicted to be above the predefined threshold at the time in the future, and further the server computing device performs the computational task in accordance with the scheduling of the computation task.

11. The method of claim 10, wherein the renewable energy resource is solar radiation.

12. The method of claim 10, wherein the renewable energy resource is wind.

13. The method of claim 10, wherein scheduling the server computing device at the data center to perform a computational task comprises at least one of:
scheduling the server computing device to be throttled at the time in the future;
scheduling the server to be powered on at or prior to the time in the future; or
scheduling the server to perform a portion of a batch job at the time in the future.

14. The method of claim 10, wherein predicting that the amount of electrical energy provided to the data center by the energy source will be above the predefined threshold at the time in the future comprises:
predicting, for the time in the future, a weather condition for a geographic region that includes the energy source, wherein the amount of electrical energy provided to the data center is predicted to be above the predefined threshold based upon the weather condition predicted for the time in the future.

15. The method of claim 14, wherein predicting, for the time in the future, the weather condition for the geographic region comprises:
computing depth of a cloud based upon an image pertaining to the geographic region, the image captured by a camera pointed upwards from earth towards sky, wherein the weather condition for the time in the future is predicted based upon the computed depth of the cloud.

16. The method of claim 14, wherein predicting, for the time in the future, the weather condition for the geographic region comprises:
computing a rate of change of size of a cloud based upon an image pertaining to the geographic region, the image captured by a camera pointed upwards from earth towards sky, wherein the weather condition for the time in the future is predicted based upon the computed rate of change of the size of the cloud.

17. The method of claim 14, wherein predicting, for the time in the future, the weather condition for the geographic region comprises:
computing a direction of travel of a cloud across the sky based upon an image pertaining to the geographic region, the image captured by a camera pointed upwards from earth towards the sky, wherein the weather condition for the time in the future is predicted based upon the computed direction of travel of the cloud across the sky.

18. The method of claim 14, wherein predicting, for the time in the future, the weather condition for the geographic region comprises:
predicting a position of the sun in the sky at the time in the future based upon an image pertaining to the geographic image, the image captured by a camera pointed upwards from earth towards the sky, wherein the weather condition for the time in the future is predicted based upon the predicted position of the sun in the sky at the time in the future.

19. The method of claim 10, wherein the amount of electrical energy provided to the data center by the energy source is predicted to be above the predefined threshold at the time in the future based upon historical amounts of energy that were previously provided to the data center by the energy source.

20. A computer-readable memory comprising instructions that, when executed by a processor, cause the processor to perform acts comprising:
predicting an amount of solar radiation that will be received by a solar panel system at a time in the future based upon an image generated by a camera, the camera pointed upwards from earth towards sky;
predicting an amount of electrical energy that will be provided to a data center by the solar system at the time in the future, the amount of electrical energy predicted based upon the amount of solar radiation predicted to be received by the solar panel system at the time in the future;
determining that the predicted amount of electrical energy is above a predefined threshold; and
scheduling a server computing device of the data center to perform a computational task at the time in the future, wherein the server computing device is scheduled to perform the computational task based upon the predicted amount of electrical energy that is to be provided to the data center at the time in the future being above the predefined threshold, wherein the server computing device performs the computational task in accordance with the scheduling of the server computing device to perform the computational task.

* * * * *